US009167199B2

(12) United States Patent
Jeong (10) Patent No.: US 9,167,199 B2
(45) Date of Patent: Oct. 20, 2015

(54) IMAGE INPUT APPARATUS WITH HIGH-SPEED, HIGH-QUALITY STILL IMAGE SUCCESSIVE CAPTURING CAPABILITY AND STILL IMAGE SUCCESSIVE CAPTURING METHOD USING THE SAME

(71) Applicant: SAMSUNG ELECTRONICS CO., LTD., Gyeonggi-do (KR)

(72) Inventor: Young-hoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/019,851

(22) Filed: Sep. 6, 2013

(65) Prior Publication Data

US 2014/0009642 A1  Jan. 9, 2014

Related U.S. Application Data

(63) Continuation of application No. 11/965,169, filed on Dec. 27, 2007, now abandoned.

(30) Foreign Application Priority Data

Dec. 29, 2006 (KR) .................. 10-2006-0138775

(51) Int. Cl.
*H04N 5/926* (2006.01)
*H04N 5/77* (2006.01)
(Continued)

(52) U.S. Cl.
CPC .............. *H04N 5/9261* (2013.01); *H04N 5/77* (2013.01); *H04N 5/772* (2013.01); *H04N 5/781* (2013.01); *H04N 5/907* (2013.01); *H04N 9/8042* (2013.01); *H04N 9/8047* (2013.01)

(58) Field of Classification Search
USPC .............. 348/231.6, 333.02, 333.05, 333.11, 348/231.9
See application file for complete search history.

(56) References Cited

U.S. PATENT DOCUMENTS 6,714,724 B1 * 3/2004 Cook ........................... 386/224
6,731,809 B1   5/2004 Taniguchi et al.
(Continued)

FOREIGN PATENT DOCUMENTS

JP    2-105786 A       4/1990
JP    2002335486 A    11/2002
(Continued)

OTHER PUBLICATIONS

Chinese Office Action dated Feb. 15, 2012 issued by the State Intellectual Property Office of P.R. China in counterpart Chinese Patent Application No. 200710185783.5.
(Continued)

*Primary Examiner* — Albert Cutler
(74) *Attorney, Agent, or Firm* — Sughrue Mion, PLLC (57) ABSTRACT

An apparatus and a method of successively capturing high quality image data at high speed are provided. The image input apparatus includes an image sensor for capturing image data from a subject; an image signal processor encoding the image data transmitted from the image sensor to produce digital image data; and a memory for storing the digital image data. The image signal processor decodes the digital image data according to an operating signal from a user and provides the user with the decoded digital image data. Therefore, the high quality image data can be obtained at high speed, and the lifespan of an external memory can be increased.

14 Claims, 7 Drawing Sheets

(51) Int. Cl.
  *H04N 5/781*    (2006.01)
  *H04N 5/907*    (2006.01)
  *H04N 9/804*    (2006.01)

(56) References Cited

U.S. PATENT DOCUMENTS

| | | | |
|---|---|---|---|
| 7,359,439 | B1 | 4/2008 | Conover |
| 7,705,904 | B2 | 4/2010 | Miyata |
| 2002/0030684 | A1* | 3/2002 | Enokida et al. ............... 345/473 |
| 2003/0194209 | A1* | 10/2003 | Kim et al. ...................... 386/68 |
| 2004/0131282 | A1* | 7/2004 | Yoshida et al. ............... 382/312 |
| 2005/0265444 | A1 | 12/2005 | Kim |
| 2006/0164557 | A1 | 7/2006 | Fukuda |
| 2006/0256868 | A1 | 11/2006 | Westerman |
| 2006/0282472 | A1* | 12/2006 | Ng et al. ....................... 707/200 |
| 2008/0060032 | A1* | 3/2008 | Toutenhoofd ................. 725/105 |
| 2008/0192129 | A1* | 8/2008 | Walker et al. .............. 348/231.2 |

FOREIGN PATENT DOCUMENTS

| | | |
|---|---|---|
| JP | 2002-354398 A | 12/2002 |
| JP | 2004-15824 A | 1/2004 |

OTHER PUBLICATIONS

Communication dated Nov. 6, 2012 issued by the Japanese Patent Office in counterpart Japanese Patent Application No. 2007-337477.

Communication, dated Feb. 13, 2013, issued by the Korean Patent Office in Korean Application No. 10-2006-0138775.

Communication from the Japanese Patent Office dated May 22, 2012, in a counterpart application No. 2007-337477.

Communication dated Aug. 3, 2012 from the State Intellectual Property Office of P.R. China in a counterpart application No. 200710185783.5.

* cited by examiner

IMAGE INPUT APPARATUS WITH HIGH-SPEED, HIGH-QUALITY STILL IMAGE SUCCESSIVE CAPTURING CAPABILITY AND STILL IMAGE SUCCESSIVE CAPTURING METHOD USING THE SAME

CROSS-REFERENCE TO RELATED PATENT APPLICATIONS

This a Continuation of application Ser. No. 11/965,169, filed Dec. 27, 2007, which claims priority from Korean Patent Application No. 10-2006-0138775, filed on Dec. 29, 2006, in the Korean Intellectual Property Office, the disclosure of which is incorporated herein in its entirety by reference.

BACKGROUND OF THE INVENTION

1. Field of the Invention

Methods and apparatuses consistent with the relate to capturing still images of high image quality at high speed.

2. Description of the Related Art

As electronic engineering has been developed, various devices for obtaining image data of high image quality have been widely distributed. For example, professional image input apparatuses such as portable digital cameras and camcorders, camera phones and personal digital assistances (PDAs) having built in cameras are widely used. In the image input apparatus, photons passing through an optical system are converted into electric signals by an image sensor, and the electric signals are converted into various image formats through an image processor.

Personal image input apparatuses have been greatly developed. A few years ago, digital cameras provided images with only two to three mega-pixels. However, digital cameras providing image data of ten mega-pixels or more are now widely used, and are being used instead of conventional analog cameras. Moreover, Internet blogs are being widely used, and thus, general users can share their own image data on Internet.

Recent image input apparatuses provide functions for compression of and reproducing of moving pictures and still images. For example, digital camcorders compress moving picture information using a moving picture codec, store the compressed moving picture data in an external recording apparatus such as an external memory, a tape, or a hard disk drive (HDD), and reproduce the moving picture data. In addition, digital camcorders can compress, store, and recover still images as well as moving pictures. Digital cameras can compress, store, and reproduce still images of high resolution, and can also compress, store, and reproduce moving pictures.

However, as image input apparatuses become more widely distributed, demands placed on image input apparatuses by users increase. Recently, the use of digital single lens reflex (DSLR) cameras that are for professional usage in order to obtain images of high image quality is increasing, and thus, the center of the camera market is moving toward DSLR cameras from high-end cameras. The user can realize various effects on pictures using the DSLR camera. For example, the user can take a picture of his/her favorite athlete from a far distance using a high-magnification lens, and pictures of celestial constellations with a long exposure time. Moreover, fantastic night views can be photographed using various filters such as a cross filter. In addition, moving subjects, for example, moving cars, athletes during a game, and babies, are photographed using a successive capturing function of the camera.

The successive capturing function is for photographing a subject moving at high speed a plurality of times within a short period of time. The successive capturing function is used when a moving subject is to be photographed, and also used when a subject is photographed successively in order to pick favorite pictures among the successive pictures.

Figure 1:
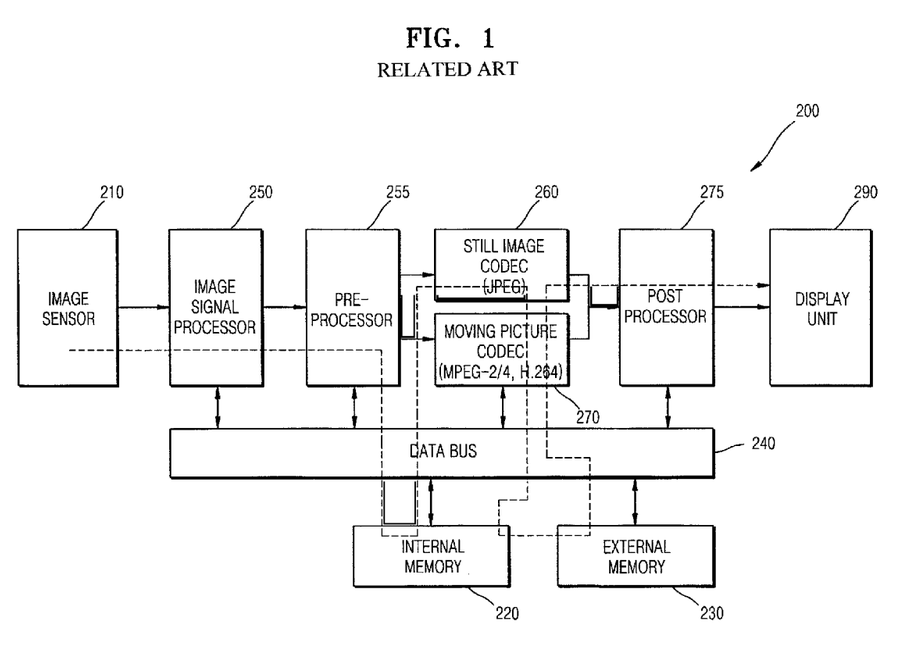
FIG. 1 is a block diagram illustrating a concept of a successive capturing method using an image input apparatus according to the related art.

FIG. 1 is a block diagram illustrating a successive capturing method using an image input apparatus according to the related art.

The image data captured by an image sensor 210 is stored in an internal memory 220 after passing through an image signal processor 250, a pre-processor 255, and a data bus 240. The image data is encoded by a still image codec 260 and stored in the internal memory 220 again, and if necessary, the image data is also stored in an external memory 230. The encoded image data is provided to a display unit 290 through a post-processor 275.

However, there is a problem in the successive capturing method used in the related art. Elements for determining the capture speed are as follows. First, the successive capture speed is determined according to a processing time of the image sensor, the size of the image data, and the resolution. Second, the time taken for compressing and reproducing the image data determines the successive capture speed, and then, a write speed of the external memory that can store the successively captured bit streams can determine the successive capture speed. The successive capture speed denotes the number of successive pictures that can be taken within a predetermined period of time, and generally, denotes the number of pictures taken per second. Among the above elements, the image capturing, the processing time of the image signal processor, and a JPEG encoding operation can be sped up by developments in semiconductor technology, and thus, the successive capture speed can be improved. However, an access speed to the external memory is slower than that of the internal memory, and thus, due to the slow access speed, a bottleneck phenomenon can happen. Therefore, there is a limitation in improving the successive capture speed due to the slow write speed of the external memory that stores the compressed JPEG files.

Figure 2:
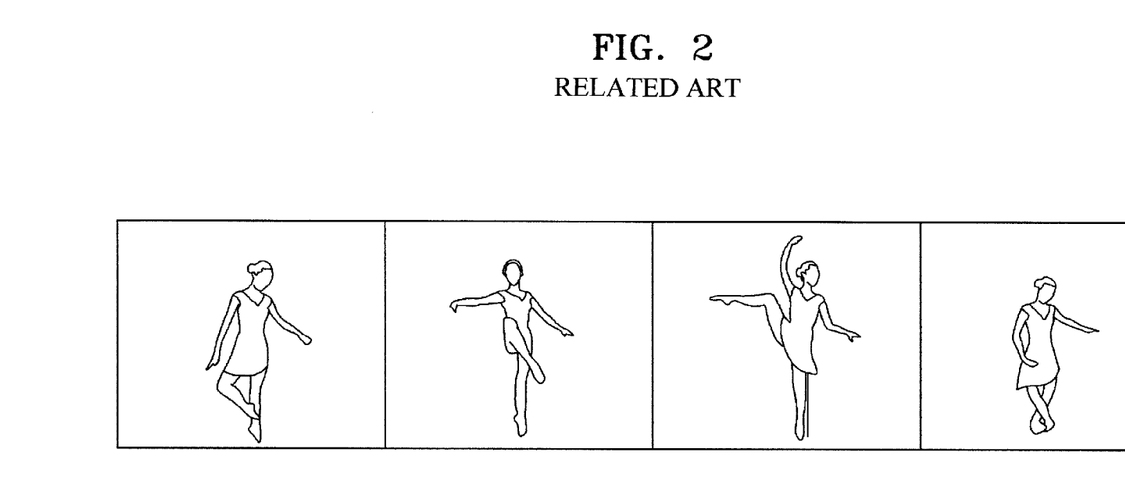
FIG. 2 shows results of the successive capturing according to the related art.

FIG. 2 is a series of photographs showing results of the successive capturing method according to the related art.

Referring to FIG. 2, when a subject who is continuously moving is photographed, a lot of the movements of the subject are lost because the successive capture speed is slow. For example, when an athlete running a marathon reaches the finish line and the athlete is successively captured, the most important shot of the athlete at the finish line, might not be captured. In addition, if a baby who cannot control his/her body by itself is successively captured, it is difficult to obtain natural images of the baby, such as the baby closing his/her eyes. Referring to FIG. 2, the movements of the subject performing a ballet are photographed unnaturally because the successive capture speed is slow.

Another problem of the related art successive capturing method is related to the external memory. If the images are successively captured by a few frames, for example, tens of frames per second, each of the frames that is compressed using a still image codec (for example, motion JPEG (M-JPEG)) is stored as an independent file. However, not all of the frames that are successively captured are effective, and the user selects a favorite one among the tens of frames. Then, the remaining tens of frames are stored in the external memory and deleted later. In this process, the frequent read/write operations of the external memory can reduce the lifespan of the external memory. Moreover, since the image data, most of which is to be deleted, is stored in the external memory, the external memory having a large capacity is required.

Therefore, a technology for reducing the amount of image data stored in the external memory while improving the successive capture speed in the digital image input apparatus is required.

SUMMARY OF THE INVENTION

The present invention provides a digital image input apparatus having an improved successive capture speed that is higher than tens of frames per second.

The present invention also provides a method and an apparatus for increasing the lifespan of an external memory by preventing frequent storage of image data in the external memory.

The present invention also provides a method and an apparatus for successively capturing image data of high image quality at high speed using an external memory having a small capacity.

According to an aspect of the present invention, there is provided an image input apparatus having a high speed, high-quality successive capturing function, the apparatus including: an image sensor for capturing image data from a subject; an image signal processor encoding the image data transmitted from the image sensor to produce digital image data; and a memory for storing the digital image data, wherein the image signal processor decodes the digital image data according to an operating signal from a user and provides the user with the decoded digital image data.

The memory may include an internal memory and an external memory, and the image signal processor may store the encoded digital image data and the decoded digital image data primarily in the internal memory.

The image signal processor may store the encoded digital image data and the decoded digital image data in the external memory if there is no storage space in the internal memory.

The image input apparatus may further include: a display unit for displaying the decoded digital image data, and the image signal processor may allow the user to select the desired digital image data among the digital image data provided to the user, and decode the selected digital image data using a predetermined still image codec and stores the decoded digital image data in the external memory.

The still image codec may be a codec complying with Joint Photographic Experts Group (JPEG) standard.

The external memory may be a memory complying with a standard selected from the group consisting of Standard Definition (SD), Multimedia Card (MMC), Compact Flash (CF), miniSD, Memory Stick (MS), xD-Picture, T-flaash, and Micro Drive (MD).

The moving picture codec may comply with a standard selected from the group consisting of H.264, Motion Picture Experts Group (MPEG)-2, and MPEG-4.

The image input apparatus may further include: a successive capturing mode selection unit that is independently formed in order to select the successive capturing function.

The successive capturing mode selection unit may have the form of one of a jog dial, an independent button, and a user interface.

According to another aspect of the present invention, there is provided a method of successively capturing still images of high image quality at high speed, the method including: capturing still images from a subject using an image sensor; encoding image data transmitted from the image sensor using a predetermined moving picture codec to produce encoded digital image data; storing the digital image data in a memory; and decoding the digital image data according to an operating signal of a user and providing the user with the decoded digital image data.

The storing of the digital image data may include: storing the encoded digital image data and the decoded digital image data primarily in an internal memory.

The storing of the digital image data may include: storing the encoded digital image data and the decoded digital image data in an external memory if there is no storage space in the internal memory.

The providing of the decoded digital image data may include: displaying the decoded digital image data; allowing the user to select desired digital image data among the digital image data provided to the user; and decoding the selected digital image data using a predetermined still image codec and storing the decoded digital image data in the external memory.

The still image codec may be a codec complying with the JPEG standard.

The external memory may be a memory complying with a standard selected from the group consisting of SD, MMC, CF, miniSD, MS, xD-Picture, T-flash, and MD.

The moving picture codec may comply with a standard selected from the group consisting of H.264, MPEG-2, and MPEG-4.

The method of successively capturing still images of high image quality at high speed may further include: detecting whether a successive capturing mode is selected using a successive capturing mode selection unit that is independently formed in order to select the high speed successive capturing function.

The successive capturing mode selection unit may be one of a jog dial, an independent button, and a user interface.

According to the present invention, image data of high image quality can be photographed at a high speed, and the number of accessing the external memory is reduced to increase a lifespan of the external memory.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings. Like reference numerals in the drawings denote like elements.

Figure 3:
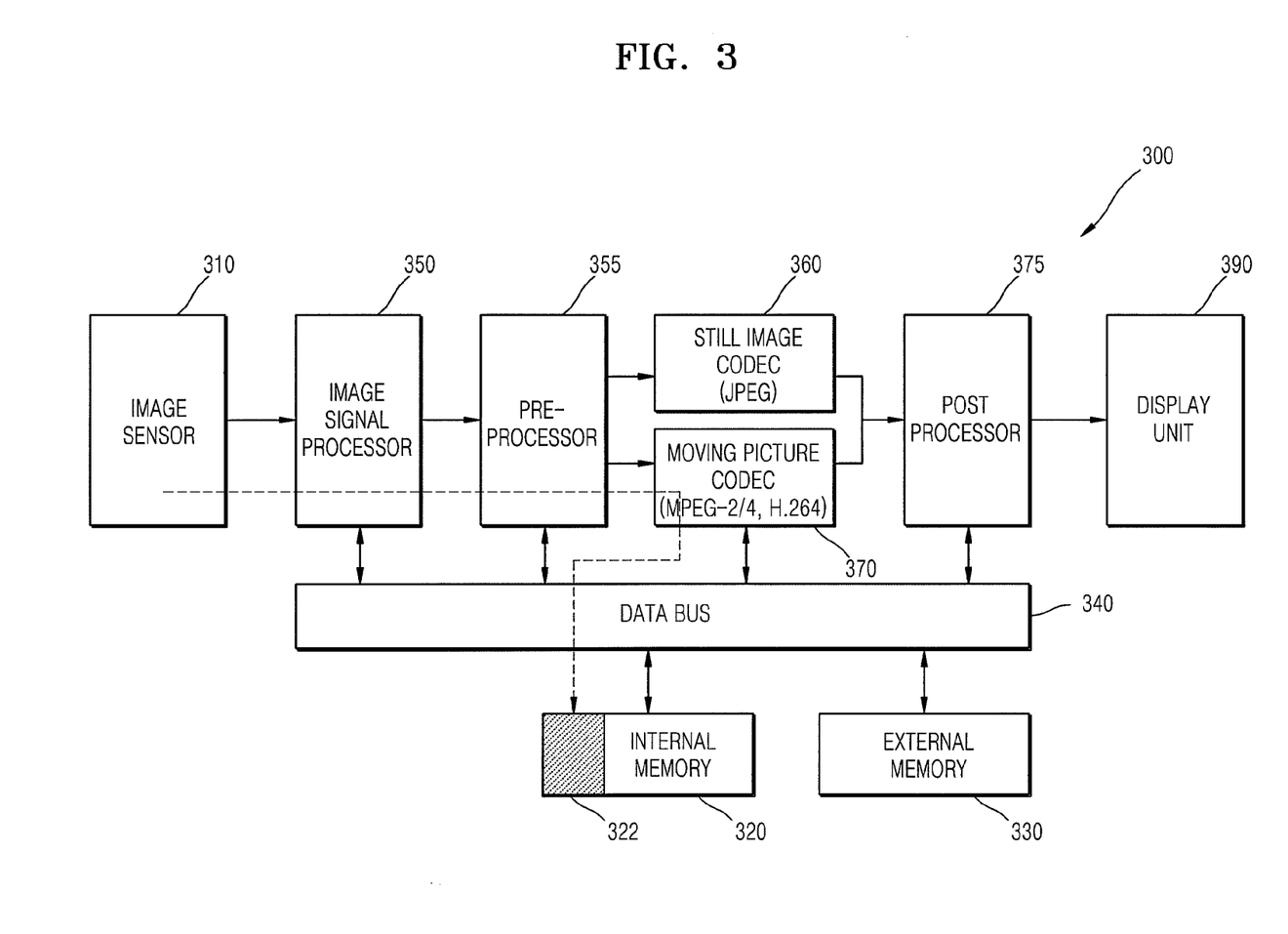
FIG. 3 is a block diagram illustrating a successive capturing operation performed in an image input apparatus according to an exemplary embodiment of the present invention.

FIG. 3 is a block diagram conceptually illustrating a successive capturing operation performed in an image input apparatus according to an exemplary embodiment of the present invention.

The image input apparatus 300 according to the exemplary embodiment includes an image sensor 310, an image signal processor 350, a pre-processor 355, a still image codec 360, a moving picture codec 370, a post processor 375, a display unit 390, a data bus 340, an internal memory 320, and an external memory 330.

The image sensor 310 converts an image input through an optical system into image data, and provides the image signal processor 350 with the image data. The image signal processor 350 transforms the image data transmitted from the image sensor 310 to adjust the color and shape of the image, the size of the image, and the frame speed, and improves the image quality of the image data. During the above processes, the image data can be temporarily stored in the internal memory 320, and compressed image data is stored in the external memory 330.

The pre-processor 355 receives still image data or moving picture data from the image signal processor 350, and converts the image data received from the image signal processor 350 into a signal suitable for the post processor 375 or stores the image data in the memory for a still image codec, a moving picture codec, or a module using the codec. The still image codec 360 such as a JPEG codec encodes/decodes still images. The moving picture codec 370 such as a MPEG-2 codec, an MPEG-4 codec, or an Audio video codec (AVC) encodes/decodes moving picture data.

The post processor 375 processes the image data transmitted from the pre-processor 355 or the codec to display the image on the image display unit 390. The components of the image input apparatus 300 transmit/receive the data through the data bus 340.

In the image input apparatus 300, the successive high speed, high image quality capturing function can be performed by changing a switch or a mode of a graphical user interface (GUI). The image data flows by the successive high speed, high image quality capturing function are different from the image data flows by a moving picture recording mode or a still image capturing mode. The successive capturing method according to an exemplary embodiment of the present invention will be described below in more detail.

First, the image sensor 310 may capture images of a SD level or a high definition (HD) level. When the resolution of the still image that is to be successively captured and the capture speed are determined, the image signal processor 350 operates a mechanical shutter (not shown) or an electronic shutter (not shown) of the image sensor 310 so as to correspond to the capture speed. Whenever the shutter operates, a still image of one frame is captured and transferred to the image signal processor 350. In the exemplary embodiment, the capture speed may be set to be 30 frames per second. In other words, the capture speed may be set at the frame rate that is used in general moving picture photography, or higher. When still images are captured 30 times per second, the user can capture a subject that is moving at a high velocity.

The still images that are captured are encoded by the moving picture codec 370, not by the still image codec 360. The still image codec 360 can use various types of codecs such as JPEG, a tagged image file (TIF), a graphics interchange format (GIF), and PCX, and the moving picture codec 370 can use various codecs such as an MPEG-2 codec, an MPEG-4 codec, an H.264 codec, and an AVC codec.

JPEG is a graphic file format that is widely used on Internet with the GIF due to a high compression efficiency, and is defined in ISO 10918-1. According to the ISO 10918-1 standard, there are various types of JPEGs, such as a sequential type, a progressive type, a hierarchical type, and Huffman type. The sequential type stores the data sequentially from an upper portion of a graphic image toward a lower portion of the graphic image. The progressive type scans a graphic image a plurality of times so that the image can be progressively more clearly shown, like an interlaced mode of the GIF. Sampling is a process of changing an RGB color system to a Y-Cb-Cr color system. At this time, some components are deleted when the Cb and Cr components are obtained, and thus, the data is compressed. A discrete cosine transform (DCT) is a process of changing the sampling data into a sum of cosine functions. Operations of the JPEG codec are well known to those who skilled in the art, and thus, detailed descriptions are omitted here.

MPEG is a standard for encoding moving picture data, and can include MPEG-1, MPEG-2, MPEG-4, and MPEG-7. Among them, MPEG-2 is a compression standard for digital broadcasting, and regulates images and voices of various channels. In addition, MPEG-4 is a compression standard for realizing Internet, IMT-2000, ATM, and LAN, and is widely used to perform communications that can reduce errors or information loss. MPEG technology is realized by motion estimation/compensation operations in which a movement between the previous frame and the current frame is estimated and compensated, and a transform coding operation for minimizing effective data. Operations of the MPEG codec are well known to those who skilled in the art, and thus, detailed descriptions are omitted here.

In the present specification, the still image codec denotes a method of intra-frame encoding using an energy distribution in a frame, and the moving picture codec is a method of inter-frame encoding using differential information between the frames. However, the present invention is not limited thereto. In general, the still image codec is used to compress image data of a unit frame so that information loss in the frame can be reduced, and the moving picture codec shows a high compression rate in a case where a lot of overlapping images exist.

Since the image input apparatus 300 of the exemplary embodiment can support the high speed successive capturing operation, the image data obtained from the images captured at the high speed can show a high similarity between the frames. Therefore, the size of the result of compression can be reduced when the image data is encoded using the moving picture codec. The image data that is encoded is temporarily stored in the internal memory 320. In FIG. 3, a portion 322 indicated by hatching in the internal memory 320 conceptually shows a portion storing image data in the internal memory 320. Since the data transmission speed of the internal memory 320 is much faster than that of the external memory 330, the image data can be stored without a bottle-neck phenomenon.

When the successive capturing is performed continuously and there is no space for storing the image data in the internal memory 320, the image data can be stored in the external memory 330. During this process, the size of image data that can be stored in the external memory 330 is determined by the operating speed of the external memory 330. In other words, the image data is continuously stored in the external memory 330 until the bottle-neck phenomenon occurs. The external memory 330 can be a flash memory such as a memory stick and an SD/MMC, or an optical storage device such as a DVD or a CD. Although the accessing speed to the external memory 330 is slower than that to the internal memory 320, the bit streams compressed using the moving picture codec 370 are stored in the external memory 330, and thus, a lot of image data of high image quality can be stored. Effects of reducing the bit rate when the image data is encoded using the moving picture codec will be described with reference to FIG. 4.

If there is no space for storing the image data in the external memory 330, the successive capturing operation is stopped or the image data can be deleted in a first-in-first-out (FIFO) way.

As described above, the image input apparatus 300 of the current embodiment compresses the still images using the moving picture codec 370, not using the still image codec 360, and thus, the amount of data stored in the memory can be reduced. Processes of selecting the image data stored in the internal memory 320 and the external memory 330 and providing the user with the image data will be described in detail with reference to FIGS. 5 and 6 later.

Figure 4A:
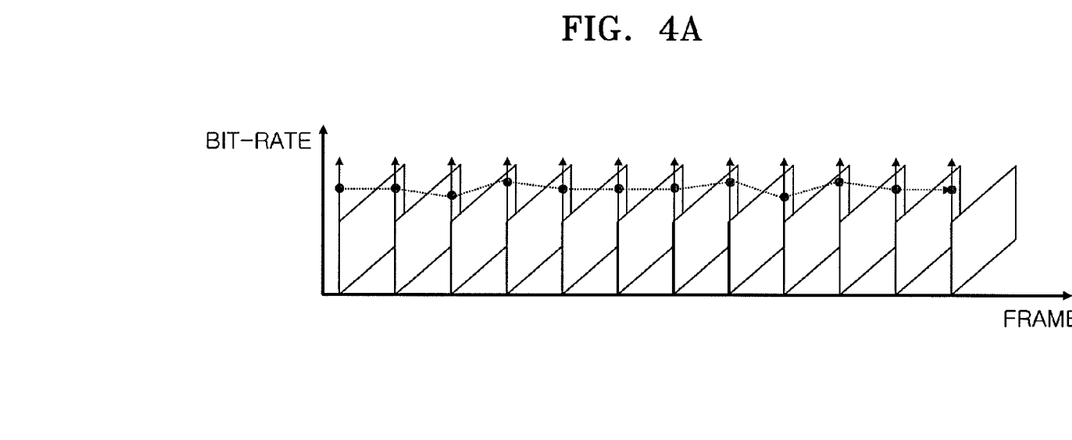
FIGS. 4A and 4B illustrate examples of bit rates of digital image data encoded by the image input apparatus according to an exemplary embodiment of the present invention.
Figure 4B:
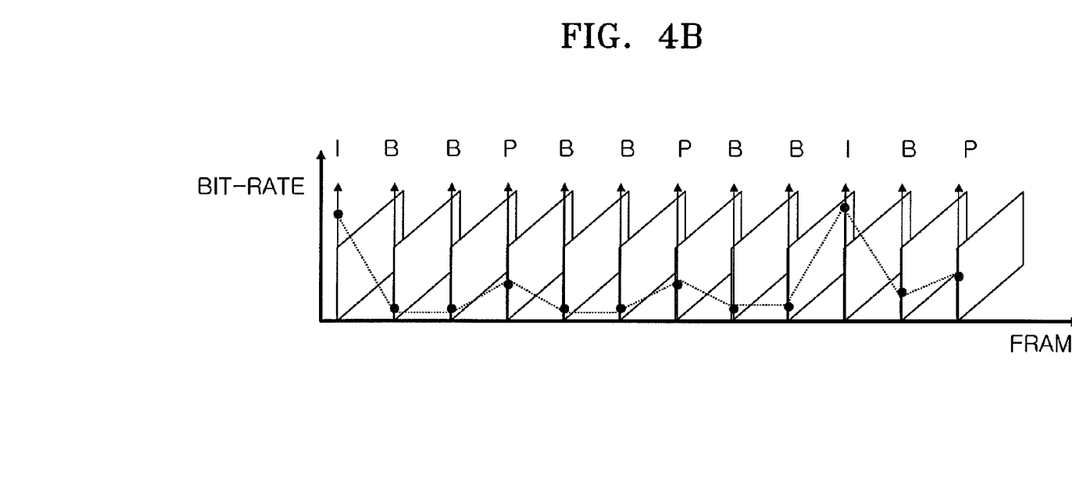

FIGS. 4A and 4B illustrate a bit rate of digital image data that is encoded in the image input apparatus of an exemplary embodiment.

FIG. 4A shows the bit rate of digital image data that is encoded using the still image codec such as the JPEG codec, and FIG. 4B shows the bit rate of the digital image data that is encoded using the moving picture codec such as the H.264 codec. The bit rate of the digital image data can be changed by changing the encoding settings, however, it is noted that the bit rate in the case of encoding the image data using the moving picture codec is greatly reduced. In a case where the still image codec is used to encode the image data, almost every frame of the image data has nearly a constant bit rate. However, when the moving picture codec is used to encode the image data, there are frames whose bit rates increase. This is because the encoding is performed in one frame when the still image codec is used while the intra-frame encoding is performed only for a reference frame that forms a motion vector when the moving picture codec is used. Therefore, the bit rate of the inter-frame encoding is lower than that of the intra-frame encoding.

Figure 5:
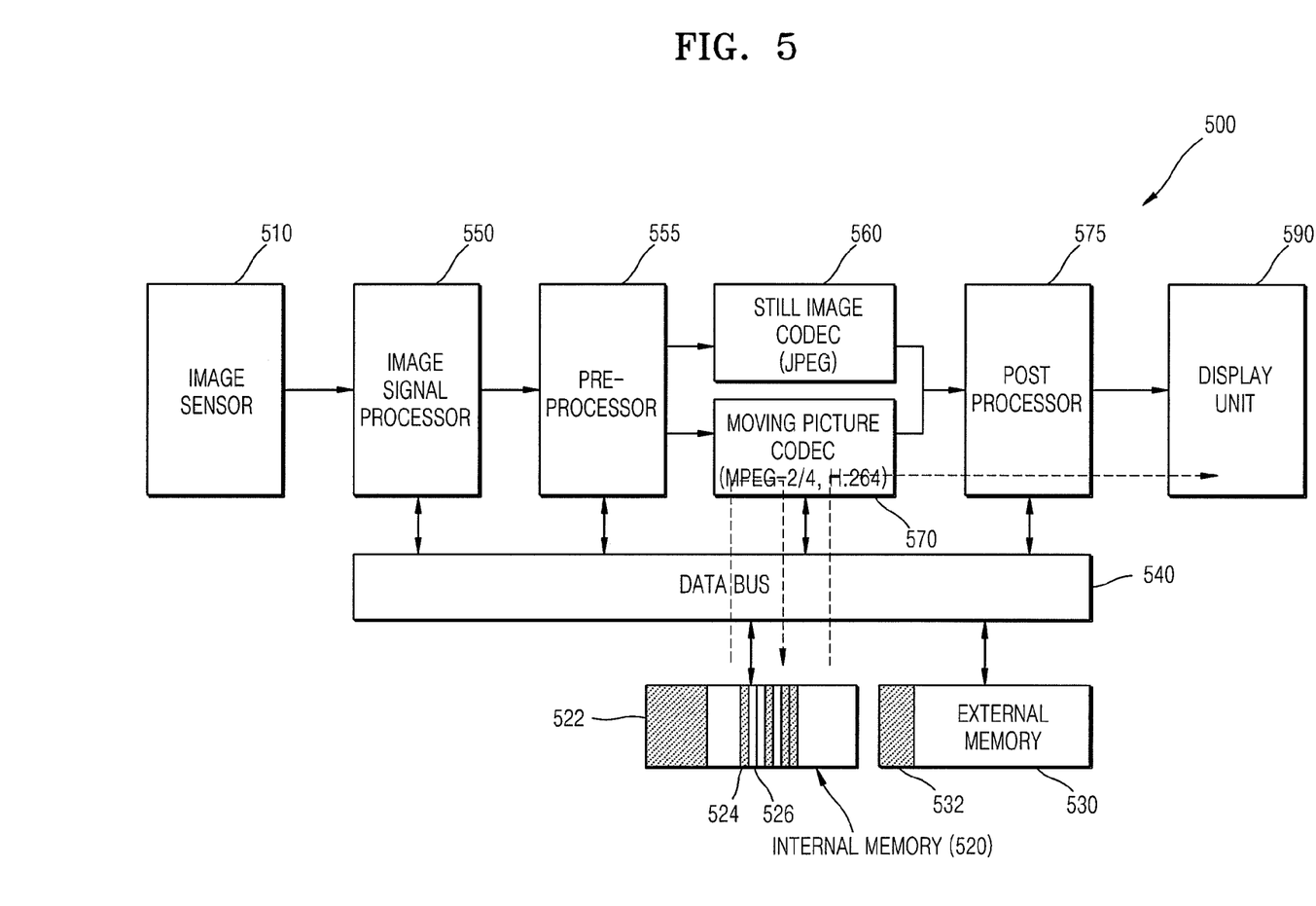
FIG. 5 is a block diagram conceptually illustrating an operation of selecting successively captured image data in the image input apparatus according to an exemplary embodiment of the present invention.

FIG. 5 is a block diagram conceptually illustrating an operation of selecting digital image data in the image input apparatus of an exemplary embodiment of the present invention.

In the image input apparatus 500 of FIG. 5, an image sensor 510, an image signal processor 550, a pre-processor 555, a still image codec 560, a moving picture codec 570, a post processor 575, a display unit 590, a data bus 540, an internal memory 520, and an external memory 530 respectively have similar structures and operations to those of the image sensor 310, the image signal processor 350, the pre-processor 350, the still image codec 360, the moving picture codec 370, the post processor 375, the display unit 390, the data bus 340, the internal memory 320, and the external memory 330 included in the image input apparatus of FIG. 3. Therefore, detailed descriptions of these units are omitted here.

Like the image input apparatus 300 of FIG. 3, the image input apparatus 500 encodes the image data that is obtained from the images captured by the image sensor 510 using the moving picture memory 570. The digital image data that is encoded is stored in the internal memory 520. In addition, a portion storing the digital image data in the internal memory 520 is represented by the hatching 522.

When the successive capturing is stopped, the digital image data stored in the internal memory 520 is decoded by the moving picture codec 570, and the digital image data is provided to the display unit 590 through the post processor 575. The display unit 590 provides the user with the digital image data. Then, the user selects one image from the displayed images. The selection can be realized by adding a tagging index to the image data. The user can delete each of the images displayed on the display unit 590 independently, however, a plurality of image data can be deleted or stored together by adding the tagging index to the image data. In the internal memory 520, portions 524 filled with slant lines denote image data selected by the user, and empty portions 526 denote image data that is not selected by the user. A process of storing the selected image data will be described below in detail.

Figure 6:
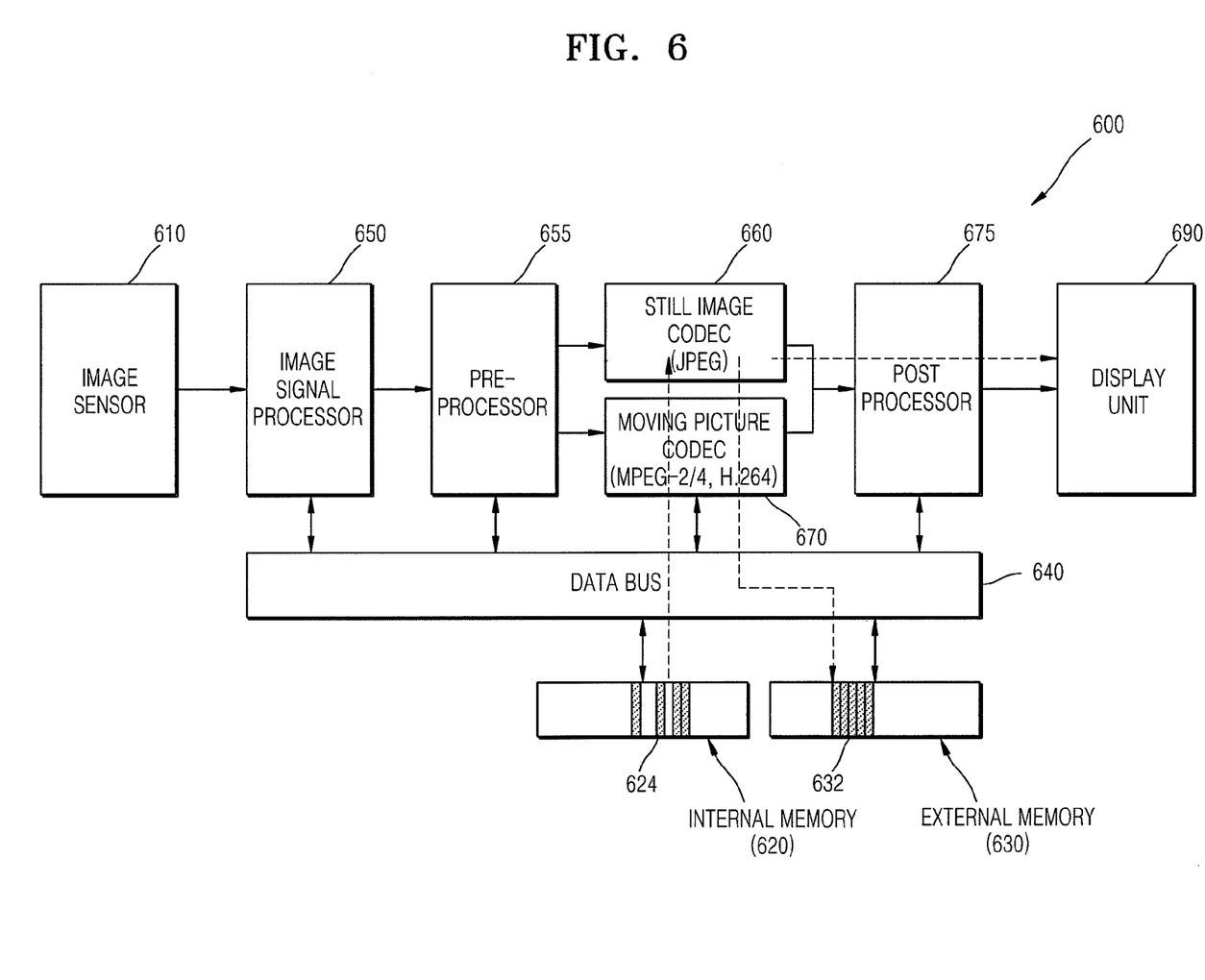
FIG. 6 is a block diagram conceptually illustrating an operation of storing the selected digital image data in an external memory in the image input apparatus according to an exemplary embodiment of the present invention.

FIG. 6 is a block diagram conceptually illustrating a process of storing selected digital image data in an external memory in an image input apparatus according to an exemplary embodiment of the present invention.

In the image input apparatus 600 of FIG. 6, an image sensor 610, an image signal processor 650, a pre-processor 655, a still image codec 660, a moving picture codec 670, a post processor 675, a display unit 690, a data bus 640, an internal memory 620, and an external memory 630 respectively have similar structures and operations to those of the image sensor 510, the image signal processor 550, the pre-processor 550, the still image codec 560, the moving picture codec 570, the post processor 575, the display unit 590, the data bus 540, the internal memory 520, and the external memory 530 included in the image input apparatus of FIG. 5. Therefore, detailed descriptions of these units are omitted here.

Like the image input apparatus 500 of FIG. 5, the image input apparatus 600 of FIG. 6 also allows the user to select a desired image from the image data stored in the internal memory 620. In FIG. 6, portions 624 filled with slant lines denote image data selected by the user.

When the selection is completed, the image input apparatus 600 encodes the selected image data using the still image codec 660, and stores the digital image data that is encoded in the external memory 630. Portions 632 filled with slant lines denote portions storing the digital image data in the external memory 630. In addition, image data that is not selected by the user among the image data stored in the internal memory 620 can be deleted to provide more storage space. As shown in FIG. 6, according to the image input apparatus 600 of the current embodiment, only the image data selected by the user among the vast amount of image data formed by the successive capturing operation can be stored in the external memory 630, and thus, the external memory 630 is not frequently accessed. Therefore, the lifespan of the external memory 630 can be increased.

The image input apparatus 600 of the current embodiment provides a successive capturing mode for capturing images of high image quality at high speed besides the conventional still image mode or the conventional moving picture mode. A mode selection unit (not shown) can be formed as a button, a dial, or a rotary switch on the outside of the image input apparatus 600. Otherwise, it can be realized as a menu through the GUI. When the mode selection unit is formed as a separate piece of hardware, the successive capturing mode can be selected easily during operating of the image input apparatus 600.

Figure 7:
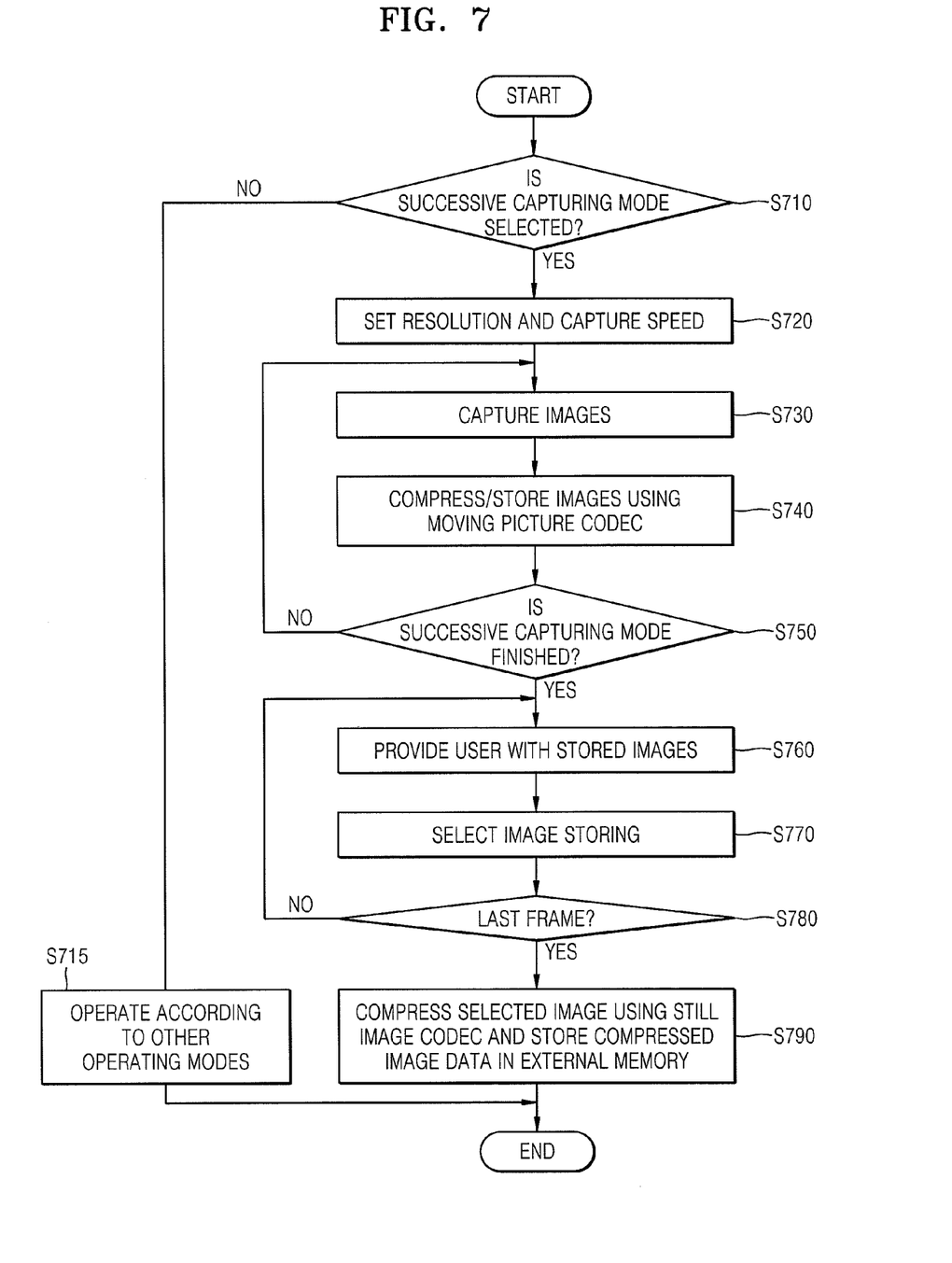
FIG. 7 is a flow chart illustrating a method of successively capturing images with high image quality and at high speed according to an exemplary embodiment of the present invention.

FIG. 7 is a flow chart illustrating a high speed, high image quality, successive capturing method according to an exemplary embodiment of the present invention.

First, it is determined whether the user selects the successive capturing mode (S710). If the user does not select the successive capturing mode, the image input apparatus operates in the general moving picture mode or the still image mode (S715).

If the user selects the successive capturing mode, the user sets an appropriate resolution and a capture speed (S720). The successive capturing mode can include various settings such as an optical zoom and a white balance adjustment during the successive capturing. All functions of the image input apparatus may be used during the successive capturing mode for obtaining the optimal image data.

When the successive capturing mode is set, the still images are captured at high speed (S730). In the exemplary embodiment, the still images may be captured at the same frame rate as that of the moving picture. The still images are compressed using the moving picture codec, not using the still image codec (S740). The still images are compressed using the moving picture codec in order to reduce the bit rate of the compressed image data as described above.

Next, it is determined whether the user stops the successive capturing operation (S750). If the successive capturing operation is not stopped, other still images are captured according to the settings. If the successive capturing operation is stopped, the stored images are provided to the user so that the user can select desired images (S760). Since the image data stored in the internal memory is compressed using the moving picture codec, the image data is decoded using the moving picture codec. Then, the user selects the desired images from the displayed images (S770). The user can select and delete a plurality of images using tagging indexes.

Then, it is determined whether the user selects the last frame (S780). If there are remaining frames, the selection is performed again, and if the selection is completed, the process of S790 is performed. Then, the image data selected by the user is finally encoded using the still image codec, and then, stored in the external memory (S790).

According to an exemplary embodiment of the present invention, the digital image input apparatus improves the successive capture speed of tens of frames per second or more.

In addition, according to an exemplary embodiment of the present invention, the number of storing operations for storing the image data of high image quality in the external memory can be reduced, and thus, the lifespan of the external memory can increase.

Moreover, the images can be captured to have high image quality using the external memory having a small capacity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image capturing apparatus comprising:
an internal memory;
an image sensor configured to capture still image data of a plurality of image frames, from a subject in a successive still image capturing mode;
an image processor configured to inter-frame encode the captured still image data of the plurality of image frames using a predetermined moving picture codec to generate digital image data, to decode the generated digital image data in order to produce a plurality of images, and to store the decoded generated digital image data in the internal memory; and
a display unit configured to display the plurality of images of the generated digital image data decoded by the image processor,
wherein, after a still image is selected from the displayed images of the generated digital image data, the image processor is configured to encode the selected still image using a predetermined still image codec prior to storing the selected still image in an external memory.

2. The image capturing apparatus of claim 1, wherein the image processor stores the encoded digital image data or the decoded digital image data primarily in the internal memory.

3. The image capturing apparatus of claim 2, wherein the image processor stores the encoded digital image data or the decoded digital image data in the external memory if there is no storage space in the internal memory.

4. The image capturing apparatus of claim 2, wherein the external memory is a memory complying with a standard selected from the group consisting of standard definition (SD), Multimedia Card (MMC), Compact Flash (CF), mini standard definition (miniSD), Memory Stick (MS), xD-Picture, T-flash, and Micro Drive (MD).

5. The image capturing apparatus of claim 1, further comprising:
a successive capturing mode selection unit that is independently formed in order to select the successive capturing function.

6. The image capturing apparatus of claim 5, wherein the successive capturing mode selection unit is one of a jog dial, an independent button, and a user interface.

7. The image capturing apparatus of claim 1, wherein the external memory comprises a flash memory, an optical storage device or a server which communicates with the image capturing apparatus via the Internet.

8. A method for capturing an image comprising:
capturing still image data of a plurality of image frames, from a subject in a successive still image capturing mode;
inter-frame encoding the captured still image data of the plurality of image frames using a predetermined moving picture codec to generate digital image data and storing the generated digital image data in an internal memory;
decoding the generated digital image data to produce a plurality of images;
displaying the plurality of images of the decoded digital image data; and
after a still image is selected from the displayed images of the digital image data, encoding the selected still image using a predetermined still image codec prior to storing the selected still image in an external memory.

9. The method of claim 8, further comprising storing the encoded digital image data or the decoded digital image data primarily in the internal memory.

10. The method of claim 9, further comprising storing the encoded digital image data or the decoded digital image data in the external memory if there is no storage space in the internal memory.

11. The method of claim 9, wherein the external memory is a memory complying with a standard selected from the group consisting of standard definition (SD), Multimedia Card (MMC), Compact Flash (CF), mini standard definition (miniSD), Memory Stick (MS), xD-Picture, T-flash, and Micro Drive (MD).

12. The method of claim 8, further comprising:
selecting a successive capturing function via a successive capturing mode selection unit that is independently formed.

13. The method of claim 12, wherein the successive capturing mode selection unit is one of a jog dial, an independent button, and a user interface.

14. The method of claim 8, wherein the external memory comprises a flash memory, an optical storage device or a server which communicates with a portable image capturing apparatus via the Internet.

* * * * *